(12) United States Patent
Smith

(10) Patent No.: US 8,188,419 B2
(45) Date of Patent: May 29, 2012

(54) ECCENTRIC FIELD IMAGING LENS WITH TITLTED AND DECENTERED SURFACES

(75) Inventor: George E Smith, Sunnyvale, CA (US)

(73) Assignee: Avago Technologies ECBU IP (Singapore) Pte. Ltd., Singapore (SG)

(*) Notice: Subject to any disclaimer, the term of this patent is extended or adjusted under 35 U.S.C. 154(b) by 462 days.

(21) Appl. No.: 12/463,346

(22) Filed: May 8, 2009

(65) Prior Publication Data

US 2010/0282950 A1    Nov. 11, 2010

(51) Int. Cl.
*H01J 40/14* (2006.01)

(52) U.S. Cl. ......................................... 250/221; 345/163

(58) Field of Classification Search .................. 345/166, 345/163, 164, 165; 250/221
See application file for complete search history.

(56) References Cited

U.S. PATENT DOCUMENTS

| | | | |
|---|---|---|---|
| 5,986,806 A | 11/1999 | Sugawara | |
| 6,188,523 B1 | 2/2001 | Choi | |
| 6,835,923 B2 * | 12/2004 | Hamalainen et al. | .... 250/227.11 |
| 7,009,776 B2 | 3/2006 | Wada | |
| 7,166,831 B2 * | 1/2007 | Depue et al. | ................... 250/221 |
| 7,655,897 B2 * | 2/2010 | Lim et al. | ...................... 250/221 |
| 7,791,015 B2 * | 9/2010 | Chen et al. | .................... 250/239 |

FOREIGN PATENT DOCUMENTS

| | | |
|---|---|---|
| JP | 5273460 | 10/1993 |
| JP | 10206791 | 8/1998 |

* cited by examiner

*Primary Examiner* — Tony Ko

(57) ABSTRACT

An optical navigation device determines relative movement between the optical navigation device and a navigation surface. The optical navigation device includes a light source, an image sensor, and an eccentric field imaging lens. The light source illuminates a navigation surface. The image sensor generates a navigation image of light scattered off of the navigation surface. The eccentric field imaging lens is disposed between the navigation surface and the image sensor. The eccentric field imaging lens includes multiple lens surfaces which are tilted at different oblique angles relative to the navigation surface to direct the light scattered off of the navigation surface toward the image sensor.

20 Claims, 6 Drawing Sheets

ECCENTRIC FIELD IMAGING LENS WITH TITLTED AND DECENTERED SURFACES

BACKGROUND

Optical mice are commonly used as navigation input devices for computers. Conventional optical mice are generally categorized by the type of light source that is used. Some optical mice use a light emitting diode (LED), while other optical mice use a laser. The light source typically illuminates a navigation surface such as a desktop. Light that reflects off of the navigation surface is sensed, or imaged, by an image sensor. The image sensor generates electrical signals representative of the light intensities incident on the image sensor. Using sequential images, a tracking engine can determine the relative movement between the optical mouse and the navigation surface.

Simple relay lenses with typically near 1:1 magnification are commonly used in both LED and laser optical mice to direct reflected light from the navigation surface to the image sensor. Such lenses are typically made of molded plastic in known designs. These conventional lenses are commonly used to image a portion of the navigation surface that is centered on the optical axis of the lens. By way of comparison, the light source is off the lens axis so that direct light does not enter the lens. Rather, scattered light reflected from the navigation surface enters the lens and allows the image sensor to form the images for navigation applications.

In some conventional systems, the lens is tilted relative to the navigation surface so that the lens can receive light from the direct specular reflection off of the navigation surface. In these types of conventional systems, distortion and depth of field issues may affect the accuracy of the lens system, so these types of lenses are often "stopped down" to get adequate depth of field.

In other conventional embodiments, the image sensor is at an oblique angle relative to the navigation surface. In this configuration, the specular reflected beam is deliberately excluded from the lens, so that only light that scatters at small angles about the specular beam is accepted by the lens system. However, this type of imaging lens is typically quite large, so that the lens is relatively fast and can create images of good quality to minimize leakage of the specular beam into the imaging lens. This precludes tilting the lens viewing or optical axis relative to the normal of the navigation surface, yet a widely eccentric field is viewed that is off the axis of the aperture stop of the system by a central field angle of 22 degrees of more.

This type of configuration would typically call for a wide field angle lens, with a good image field of view of over 50 degrees diameter, yet it forms an undistorted image of the eccentric field with sharp image quality. In an optical mouse, most of the useful field of view of such a wide field angle lens is not utilized. Consequently, this type of conventional configuration would be costly to implement.

It should also be noted that this type of configuration might be implemented using a Scheimflug arrangement. In a Scheimflug arrangement, the object plane and the image plane are at a first angle relative to each other, and the lens is at some other angle. In some arrangements, the lens and the aperture stop have a common optical axis, which is horizontal so the lens is substantially vertical. In some embodiments, the object plane and the image plane of the Scheimflug geometry intersect on the plane of the lens.

Although this arrangement may provide an image that is substantially in focus on the tilted image plane, certain illuminated portions may have a higher magnification. In this way, the magnification changes over the image surface, so that the image exhibits pronounced "keystone" distortion of rectangular objects. Hence, the conventional Scheimflug arrangement is less than ideal because of the keystone distortion.

SUMMARY

Embodiments of an apparatus are described. In one embodiment, the apparatus is an optical navigation device to determine relative movement between the optical navigation device and a navigation surface. The optical navigation device includes a light source, an image sensor, and an eccentric field imaging lens. The light source illuminates a navigation surface. The image sensor generates a navigation image of light scattered off of the navigation surface. The eccentric field imaging lens is disposed between the navigation surface and the image sensor. The eccentric field imaging lens includes multiple lens surfaces which are tilted at different oblique angles relative to the navigation surface to direct the light scattered off of the navigation surface toward the image sensor.

In another embodiment, the apparatus is an optical navigation device to determine relative movement between the optical navigation device and a navigation surface. An embodiment of the optical navigation device includes a light source, an aperture stop, an optical lens system, and an image sensor. The light source illuminates a portion of a navigation surface within an object plane. Specular light reflects off of the navigation surface along a specular reflection path. Scattered light reflects off of a surface feature at the navigation surface along a scattered light path, which is offset from the specular reflection path. The aperture stop is disposed within the scattered light path. Also, the aperture stop has an optical axis defined by a normal to the aperture stop, and the optical axis of the aperture stop is substantially perpendicular to the object plane. The optical lens system is also disposed within the scattered light path to receive the scattered light through the aperture stop. The optical lens system includes a plurality of lens surfaces, which are tilted at different oblique angles relative to the navigation surface. The image sensor receives the scattered light from the optical lens system and generates a sequence of navigation images of at least part of the illuminated portion of the surface feature at the navigation surface, as the optical navigation device moves relative to the navigation surface. Additionally, in some embodiments, the image sensor is oriented substantially parallel with the navigation surface. Other embodiments of the apparatus are also described.

Embodiments of a method are also described. In one embodiment, the method is a method for operating an optical navigation device. An embodiment of the method for operating the optical navigation device includes emitting light from a light source to illuminate a portion of a navigation surface within an object plane. Specular light reflects off of the navigation surface along a specular reflection path, and scattered light reflects off of a surface feature at the navigation surface along a scattered light path, which is offset from the specular reflection path. The method also includes receiving the scattered light at an aperture stop disposed within the scattered light path. The aperture stop has an optical axis defined by a normal to the aperture stop. The optical axis of the aperture stop is substantially perpendicular to the object plane. The method also includes receiving the scattered light through the aperture stop at an optical lens system disposed within the scattered light path. The optical lens system includes a plurality of lens surfaces, which are tilted at different oblique angles relative to the navigation surface. The method also includes receiving the scattered light from the optical lens system at an image sensor. The method also includes generating a sequence of navigation images of at least part of the illuminated portion of the surface feature at the navigation surface, as the optical navigation device moves relative to the navigation surface. The image sensor is oriented substantially parallel with the navigation surface. Other embodiments of the method for operating the optical navigation device are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
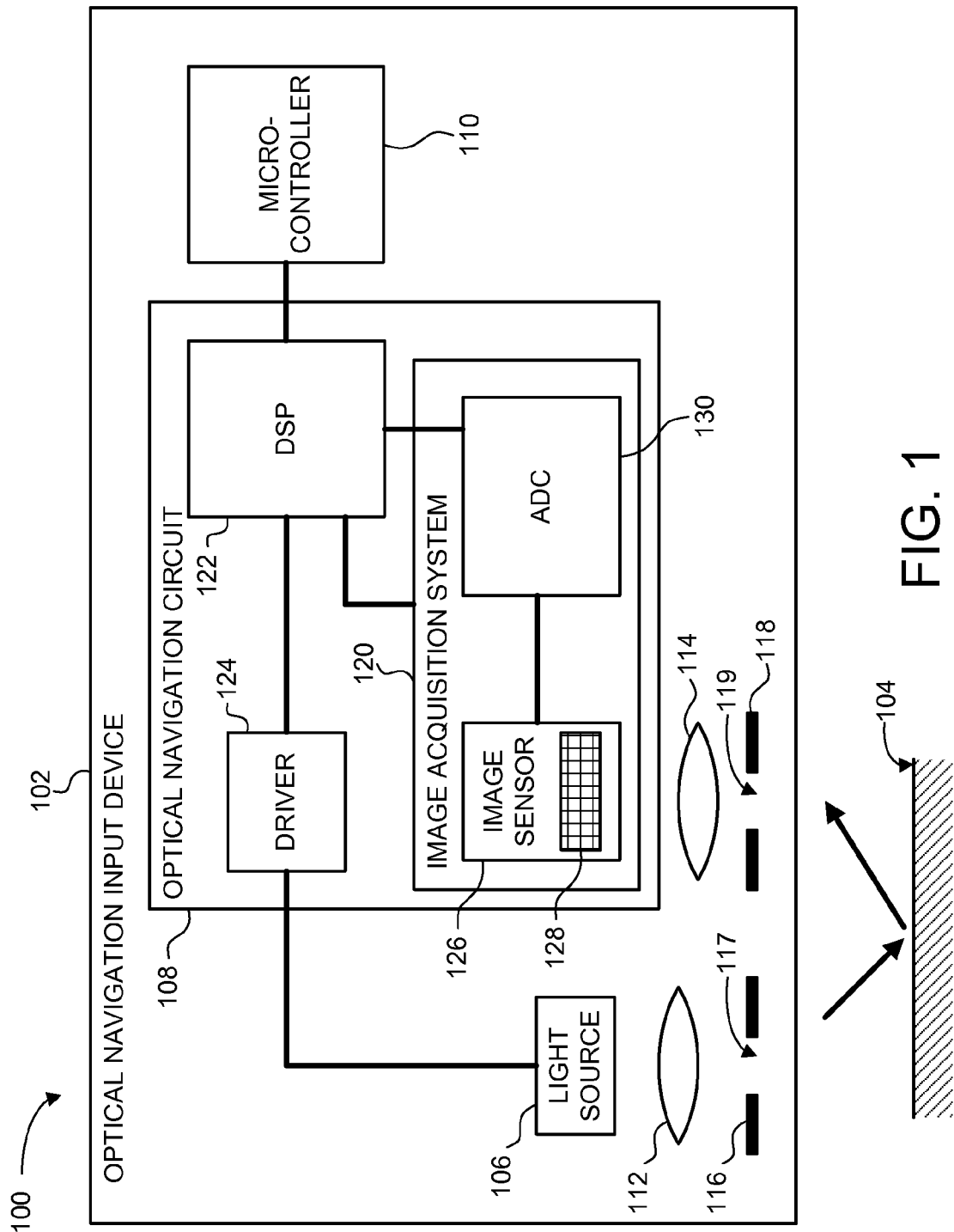
FIG. 1 depicts a schematic block diagram of one embodiment of an optical navigation system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments have a lens aperture stop and final image sensor plane that are each parallel to, but eccentrically displaced from a navigation surface, yet form sharp bright images of the eccentric field of view, which may have a center point at about 22 degrees or more off the stop axis. In one embodiment, a two surface aspheric molded plastic lens is employed, in which each of the two surfaces is separately decentered and tilted relative to each other and to the optical axis defined by the normal to the aperture stop. Since the imaging lens has an eccentric field of view, the imaging lens is also referred to as an eccentric field imaging lens.

FIG. 1 depicts a schematic block diagram of one embodiment of an optical navigation system 100. The illustrated optical navigation system 100 includes an optical navigation input device 102 and a navigation surface 104. In general, the optical navigation input device 102 illuminates portions of the navigation surface 104 in order to generate optical images of the illuminated portions or features at the navigation surface 104. Hence, the navigation surface 104 also may be referred to as an illumination surface. More specifically, the optical navigation input device 102 moves relative to the navigation surface 104 and generates one or more navigation signals representative of the movement of the optical navigation input device 102 relative to the navigation surface 104. Additionally, since the navigation surface 104 is used to track the movement of the optical navigation input device 102, the navigation surface 102 also may be referred to as a tracking surface.

In order to illuminate the navigation surface 104, the optical navigation input device 102 emits a light beam, which is at least partially reflected by the navigation surface 104. The optical navigation input device 102 detects the reflected light beam and processes the reflected light beam to generate the navigation signals. Examples of how the navigation signals may be generated are described in more detail below.

The navigation surface 104 may be any type of surface and may include one or more types of material compositions. Examples of typical navigation surfaces 104 include wood, stone, or plastic laminate desktops, as well as fabric or other textured navigation pads (e.g., a mouse pad). Some types of navigation surfaces 104 are highly specular so that substantially all of the light incident on the navigation surface 104 is specularly reflected and not diffusely scattered in other directions. One example of a highly specular navigation surface 104 is a glass surface. Other embodiments may include other types of specular navigation surfaces.

The distance between the optical navigation input device 102 and the navigation surface 104 may vary depending on the application for which the optical navigation input device 102 is used. In surface navigation applications, the optical navigation input device 102 may be relatively close to the navigation surface 104. For example, a housing (not shown) of the optical navigation input device 102 may be in direct, physical contact with the navigation surface 104. Alternatively, stand-off structures (not shown) attached to the housing of the optical navigation input device 102 may be in direct, physical contact with the navigation surface 104. In other embodiments, the optical navigation input device 102 may be within a few centimeters or inches of the navigation surface 104, without being in direct, physical contact with the navigation surface 104.

The depicted optical navigation input device 102 includes a light source 106, an optical navigation circuit 108, and a microcontroller 110. The optical navigation input device 102 also includes optical elements 112 and 114, an illumination aperture structure 116 which defines an illumination aperture 117, and an imaging aperture structure 118 which defines an imaging aperture 119. Other embodiments may include fewer or more components. For example, some embodiments of the optical navigation input device 102 may exclude one or more of the optical element 112 and the illumination aperture structure 116.

In one embodiment, the light source 106 is a light emitting diode (LED). In another embodiment, the light source 106 is a laser. For example, the light source 106 may be a vertical cavity surface emitting laser (VCSEL). Alternatively, the light source 106 may be another type of laser or other light source.

In general, the light source directs a light beam toward the navigation surface 104 to illuminate a primary illumination spot at the navigation surface 104. If the navigation surface 104 is substantially specular, then the light beam reflects off of the navigation surface 104 along a specular reflection path. The incident light beam (i.e., the light traveling toward the navigation surface 104) may pass through the optical element 112 and the illumination aperture 117 formed by the illumination aperture structure 116. Similarly, the reflected light beam (i.e., the light reflected from the navigation surface 104) may pass through the imaging aperture 119, formed by the imaging aperture structure 118, and then pass through the optical element 114. Specific functionality of the imaging optical element 114, the imaging aperture structure 118, and the imaging aperture 119 is described in more detail below with reference the remaining figures.

If there are any surface features such as dust or scratches at the navigation surface 102, then some of the incident light may be reflected and scattered along one or more scattered light paths, which are offset from the specular reflection path. Essentially, any path that is not the specular reflection path may be considered a scattered light path. In the case of diffuse reflection off of a surface feature, the reflected light may be diffused, or scattered in substantially all directions. Although there may be many types of surface features which scatter the reflected light in different directions, some examples of surface features include particles (e.g., dust) on the navigation surface 104, aberrations (e.g., scratches) in the navigation surface 104, texture of the navigation surface 104, as well as imperfections below or beneath the navigation surface 104.

The depicted optical navigation circuit 108 includes an image acquisition system (IAS) 120, a digital signal processor (DSP) 122, and a driver 124. In one embodiment, the driver 124 of the optical navigation circuit 108 controls the operation of the light source 106 (e.g., using a driver signal) to generate the light beam that is emitted toward the navigation surface 104. As described above, the reflected light beam, or a portion thereof, is then received by the image acquisition system 120.

The depicted image acquisition system 120 includes an image sensor 126 and an analog-to-digital converter (ADC) 130. The image sensor 126 includes a pixel array 128. In one embodiment, the image sensor 126 generates a plurality of electrical signals corresponding to reflected light at the pixel array 128. Each of the electrical signals corresponds to one of the picture elements (or pixels) of the pixel array 128. In one embodiment, each pixel is a photosensor or other photosensitive device. At least a portion of the light beam reflected from the navigation surface 104 is incident on the pixel array 128. In one embodiment, the imaging optical element 114 facilitates resolution of microscopic surface images at the pixel array 128. Alternatively, the imaging optical element 114 facilitates resolution of more distant objects in a free space navigation environment.

The analog-to-digital converter (ADC) 130 converts the plurality of electrical signals, received from the pixel array 128 of the navigation sensor 126, from analog signals to digital signals. The analog-to-digital converter 130 then passes the digital signals to the digital signal processor 122.

After the digital signal processor 122 receives the digital form of the electrical signals from the analog-to-digital converter 130 of the image acquisition system 120, the digital signal processor 122 may perform additional processing using the digital signals. The digital signal processor 122 then transmits one or more signals to the microcontroller 110. Examples of types of signals transmitted from the digital signal processor 122 of the optical navigation circuit 108 to the microcontroller 110 include channel quadrature signals based on $\Delta x$ and $\Delta y$ relative displacement values. These signals, or other signals, may be indicative of a movement of the optical navigation input device 102 relative to the navigation surface 104.

Figure 2:
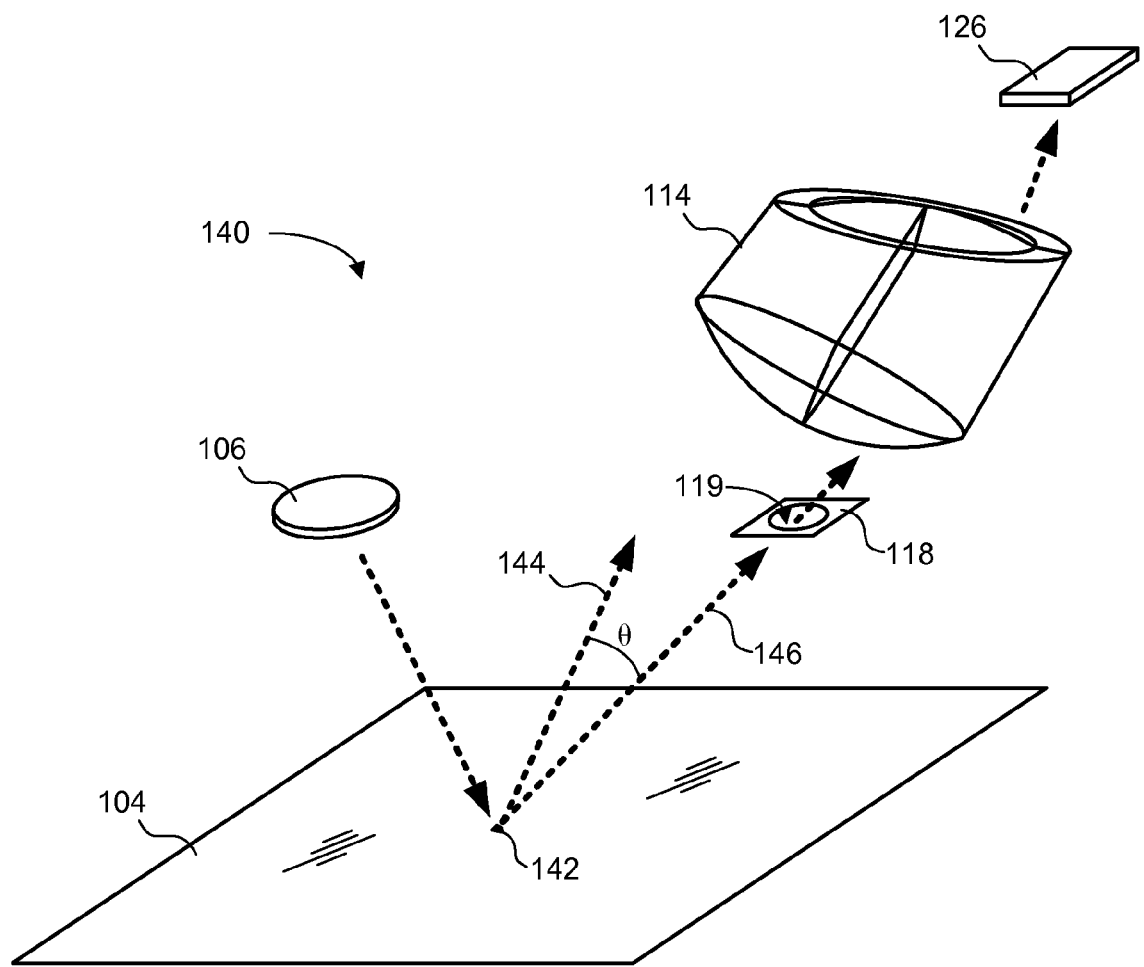
FIG. 2 depicts a perspective view of certain components of the optical navigation system of FIG. 1.

FIG. 2 depicts a perspective view 140 of certain components of the optical navigation system 100 of FIG. 1. In particular, FIG. 2 illustrates the light source 106, the navigation surface 104, the imaging aperture structure 118 that defines the imaging aperture 119, the imaging optical element 114, and the image sensor 126. Other embodiments of the optical navigation input device 102 may include fewer or more components to implement less or more functionality.

As explained above, the light source 106 emits light toward the navigation surface 104, which includes a surface feature 142 (e.g., a dust particle, texture, or a scratch). A portion of the light incident on the navigation surface 104 is specularly reflected from the navigation surface 104 along a specular reflection path 144. The remaining light is reflected along a scattered light path 146. The scattered light path 146 is offset from the specular reflection path 144 by an angle, $\theta$.

In one embodiment, light from the light source 106 is directed toward the illumination optical element 112 (not shown in FIG. 2). The illumination optical element 112 represents a collimating lens structure interposed between the light source 106 and the navigation surface 104. The collimating lens structure includes at least one optical lens to collimate the light beam. The collimating lens structure also directs the light beam through the illumination aperture 117 to the navigation surface 104.

By aligning the components of the optical navigation input device 102 so that the imaging aperture 119 is aligned near but outside of the specular reflection path 144, the imaging aperture 119 is disposed within a scattered light path 146 which is offset from the specular reflection path 144. Although the size of the imaging aperture 119 may vary depending on the implementation of the optical navigation input device 102, in some embodiments the imaging aperture 119 has a diameter (or equivalent dimension for non-circular shapes) of approximately 0.5 to 5.0 mm. Other embodiments may have dimensions of less than 0.5 or greater than 5.0 mm.

In some embodiments, the scattered light path 146 is offset from the specular reflection path 144 of the light beam by less than about 15 degrees. In other embodiments, the scattered light path 146 is offset from the specular reflection path 144 of the light beam by about 5 to 10 degrees. In other embodiments, the scattered light path 146 is offset from the specular reflection path 144 of the light beam by about 0.01 to 5 degrees. Other embodiments may use other offset angles that are greater than about 15 degrees.

In one embodiment, the imaging aperture structure 118 defines the imaging aperture 119 disposed within the scattered light path 144. This location allows the imaging aperture 119 to receive the scattered light from the surface feature 142 and to direct at least a portion of the scattered light toward the imaging optical element 114 and the image sensor 126.

In one embodiment, the imaging optical element 114 is an imaging lens structure disposed within the scattered light path 146 and interposed between the imaging aperture 119 and the image sensor 126. The imaging optical element 114 includes at least two optical elements to direct the scattered light to the image sensor 126. In particular, the imaging lens structure includes at least two lens surfaces, which are described in more detail below with reference to FIG. 3.

The image sensor 126 is also disposed within the scattered light path 146 at a location corresponding to the imaging optical element 114. The image sensor 126 receives the scattered light from the surface feature 142, via the imaging aperture 119 and the imaging optical element 114, and generates a navigation image of the surface feature 142 and potentially surrounding features at the navigation surface 104. The navigation image may be used to generate one or more navigation signals, as described above with reference to the description of FIG. 1.

Figure 3:
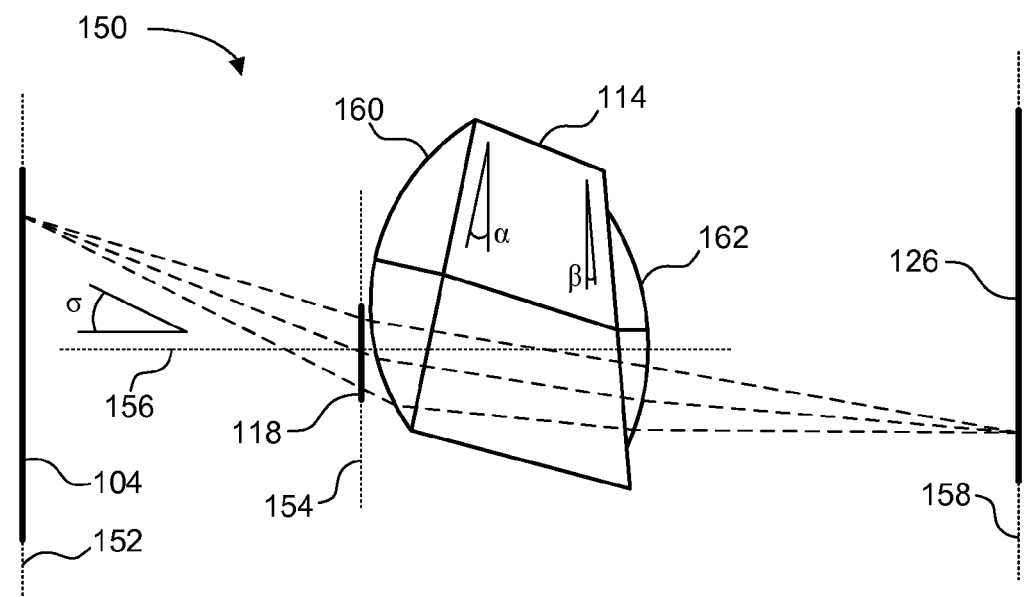
FIG. 3 depicts a light ray diagram of light rays relative to certain components of the optical navigation system of FIG. 1.

FIG. 3 depicts a light ray diagram 150 of light rays relative to certain components of the optical navigation system 100 of FIG. 1. In particular, the light rays are shown relative to the navigation surface 104, the imaging aperture structure 118 (which defines the corresponding imaging aperture 119), the imaging optical element 114, and the image sensor 126.

For reference, several planes and angles are also shown for the purpose of describing the orientation of the imaging aperture structure 118 and the imaging optical element 114 relative to the navigation surface 104 and the image sensor 126. The navigation surface 104 is disposed within an object plane 152 (also referred to as an eccentric field plane). The imaging aperture structure 118 (i.e., the aperture stop) is disposed within an aperture plane 154. In some embodiments, the aperture plane 154 is substantially parallel to the object plane 152. The aperture stop 118 also has an optical axis 156 which is substantially normal to the aperture plane 154 and, hence, the object plane 152. The image sensor 126 is disposed within an image plane 158 which, in some embodiments, is substantially parallel to the aperture plane 154 and/or the navigation plane 152.

In the illustrated embodiment, scattered light reflects off of the navigation surface 104 at an angle, σ, relative to the normal of the object surface 152 and the optical axis 156 of the aperture stop 118. In this way, the aperture stop 118 is eccentrically displaced from the primary illumination spot on the navigation surface 104. In some embodiments, the angle, σ, may be about 22 degrees or more.

The imaging optical element includes two lens surfaces 160 and 162, which are each tilted relative to the aperture plane 154. Specifically, the first lens surface 160 is tilted at a first angle, α, and the second lens surface 162 is tilted at a second angle, β. The first and second angles, α and β, may be any oblique angles up to about 40 degrees in either direction. In other words, the first and second angles may be between about −40 to 0 degrees or between about 0 to 40 degrees.

The focal lengths of the lens surfaces 160 and 162 may vary depending on the size and assembly configuration of the optical navigation input device 102. In some embodiments, the focal lengths of the lens surfaces 160 and 162 are about one fourth of the total distance between the navigation surface 104 (or the eccentric field plane 152) and the image sensor 126 (or the image plane 158). This focal length may provide approximately 1:1 magnification. In some embodiments, the focal lengths of the lens surfaces 160 and 162 are identical. In other embodiments, each of the lens surfaces 160 and 162 may have a different focal length. The other dimensions of the lens surfaces 160 and 162 (e.g., the clear apertures) may be dictated by the practicality of tooling such surfaces, taking into account the specific tilt angle of each surface.

In one embodiment, the first and second lens surfaces 160 and 162 are tilted in opposite directions relative to the aperture plane 154. For example, in the illustrated embodiment, the first lens surface 160 is tilted clockwise from the aperture plane 154, while the second lens surface 162 is tilted counterclockwise from the aperture plane 154. In other embodiments, the first and second lens surfaces 160 and 162 may be tilted in the same rotational direction relative to the aperture plane 154.

In some embodiments, the lens surfaces 160 and 162 are also decentered relative to the aperture stop 118 and/or relative to each other. Thus, the first lens surface 160 is decentered relative to the second lens surface 162. In one specific example, either or both of the lens surfaces 160 and 162 may be decentered up to about 40% of the diameter of each of the lens surfaces 160 and 162.

In some embodiments, the first and second lens surfaces 160 and 162 of the imaging optical element 114 are integrally formed as a two surface aspheric molded plastic lens. Alternatively, the lens surfaces 160 and 162 may be formed of another material. Also, in some embodiments, the lens surfaces 160 and 162 may be separately formed. In further embodiments, the imaging optical element 114 may include more than two lens surfaces. Additionally, one or more of the lens surfaces 160 and 162 may be spherical or another shape.

Embodiments of the illustrated configuration are capable of forming sharp and bright images of the eccentric field of view, whose center point is about 22 degrees or more off of the optical axis 156 of the aperture stop 118. In such embodiments, the lens surfaces 160 and 162 may be optimized for just the smaller eccentric field of view, without regard for image performance outside of the designated eccentric field of view.

Figure 4:
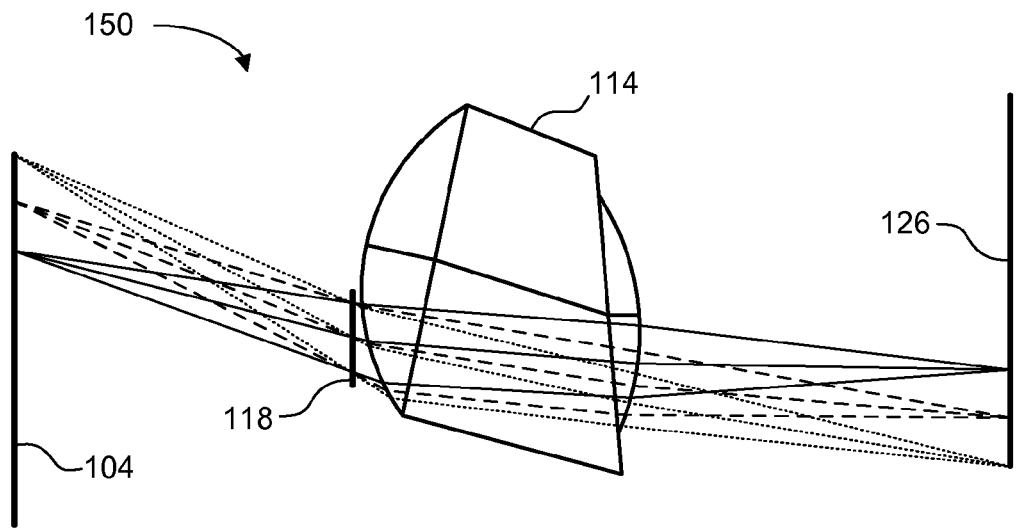
FIG. 4 depicts another light ray diagram of light rays relative to certain components of the optical navigation system of FIG. 1.

FIG. 4 depicts another light ray diagram 150 of light rays relative to certain components of the optical navigation system 100 of FIG. 1. In this illustration, the separate light rays are shown using different line types so that the corresponding locations of the separate light rays at the navigation surface 104 and the image sensor 126 can be more easily identified.

Figure 5:
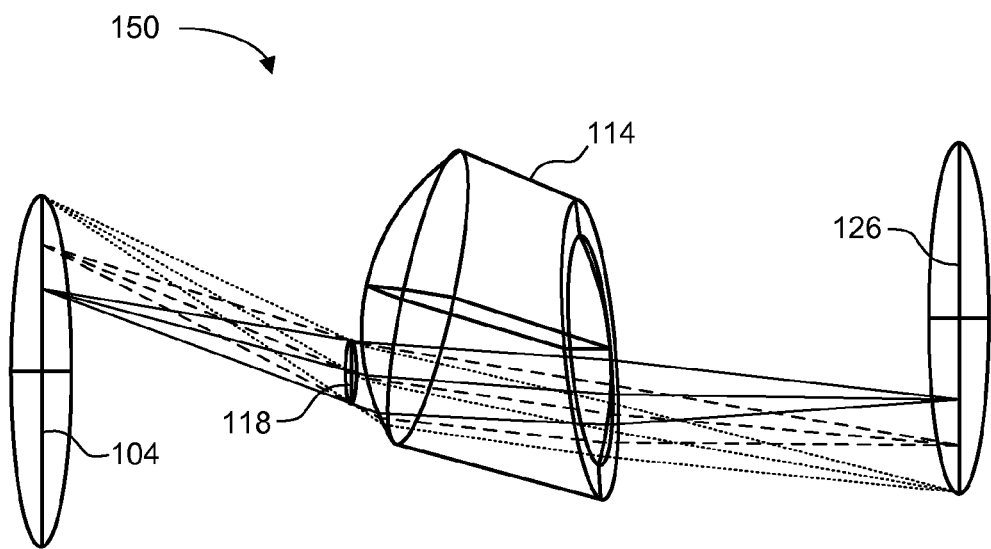
FIG. 5 depicts a perspective light ray diagram similar to the light ray diagram of FIG. 4.

FIG. 5 depicts a perspective light ray diagram 150 similar to the light ray diagram 150 of FIG. 4. In particular, FIG. 5 illustrates the navigation surface 104, the aperture stop 118, the imaging optical element 114, and the image sensor 126 in a partially perspective view.

Figure 6:
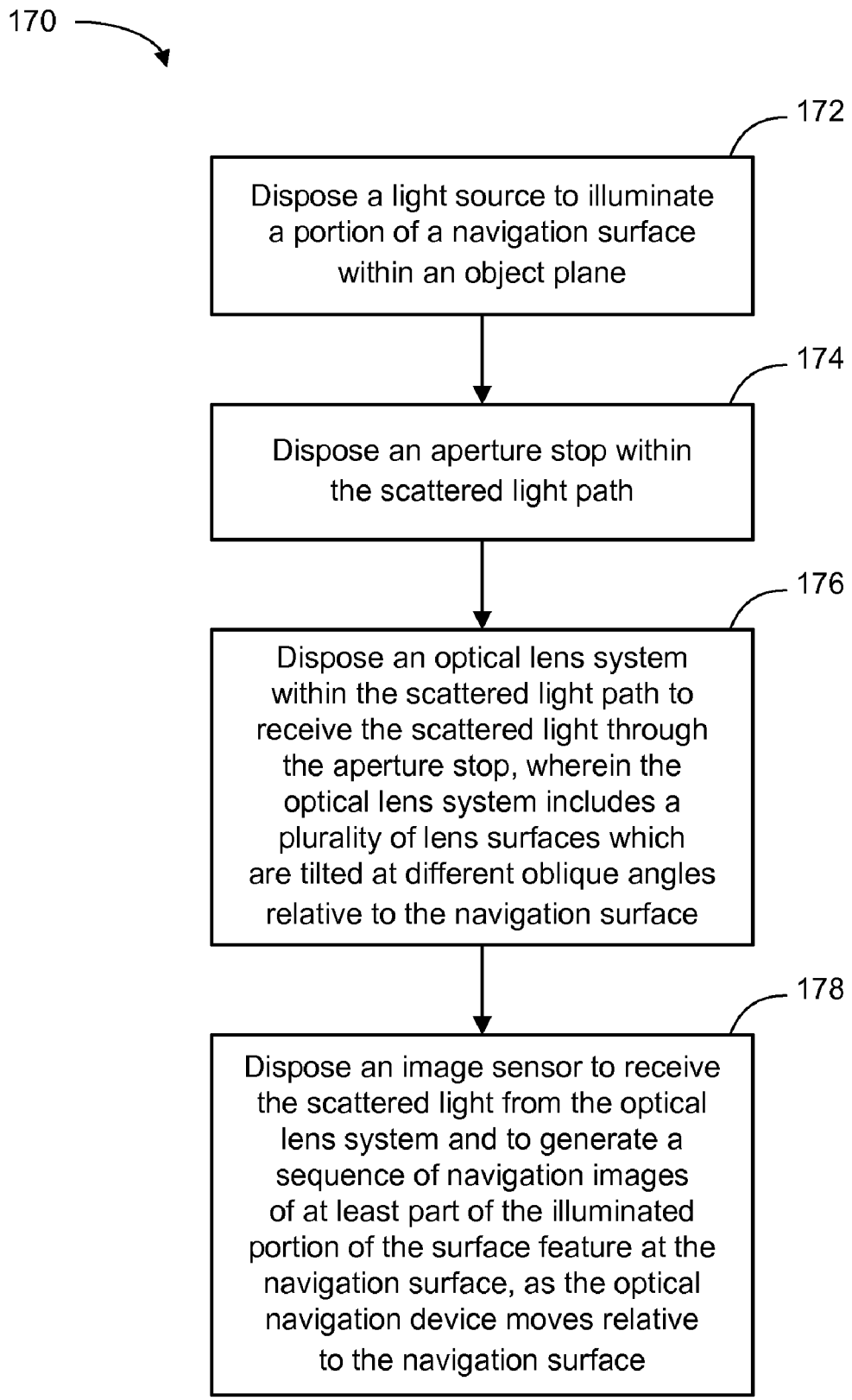
FIG. 6 depicts a flow chart diagram of one embodiment of method for making an optical navigation device with the eccentric field imaging lens of the previous figures.

FIG. 6 depicts a flow chart diagram of one embodiment of method 170 for making an optical navigation device 102 with the eccentric field imaging lens 114 of the previous figures. Although the method 170 is described in conjunction with the optical navigation device 102 of FIG. 1, embodiments of the method 170 may be implemented with other types of optical navigation devices.

At block 172, a light source 106 is disposed to illuminate a portion of a navigation surface 104 within an object plane 152. During operation of the light source 106, specular light reflects off of the navigation surface 104 along a specular reflection path 144, and scattered light reflects off of a surface feature 142 at the navigation surface 104 along a scattered light path 146, which is offset from the specular reflection path 144. At block 174, an aperture stop 118 is disposed within the scattered light path 146. The aperture stop 118 has an optical axis 156 defined by a normal to the aperture stop 118. The optical axis 156 of the aperture stop 118 is substantially perpendicular to the object plane 152, as described above. At block 176, an optical lens system 114 is disposed within the scattered light path 146 to receive the scattered light through the aperture stop 118. The optical lens system 114 includes a plurality of lens surfaces 160 and 162 which are tilted at different oblique angles, α and β, relative to the navigation surface 104. At block 178, an image sensor 126 is disposed to receive the scattered light from the optical lens system 114 and to generate a sequence of navigation images of at least part of the illuminated portion of the surface feature 142 at the navigation surface 104, as the optical navigation device 102 moves relative to the navigation surface 104. The image sensor 126 is oriented substantially parallel with the navigation surface 104. The depicted method 170 then ends.

Figure 7:
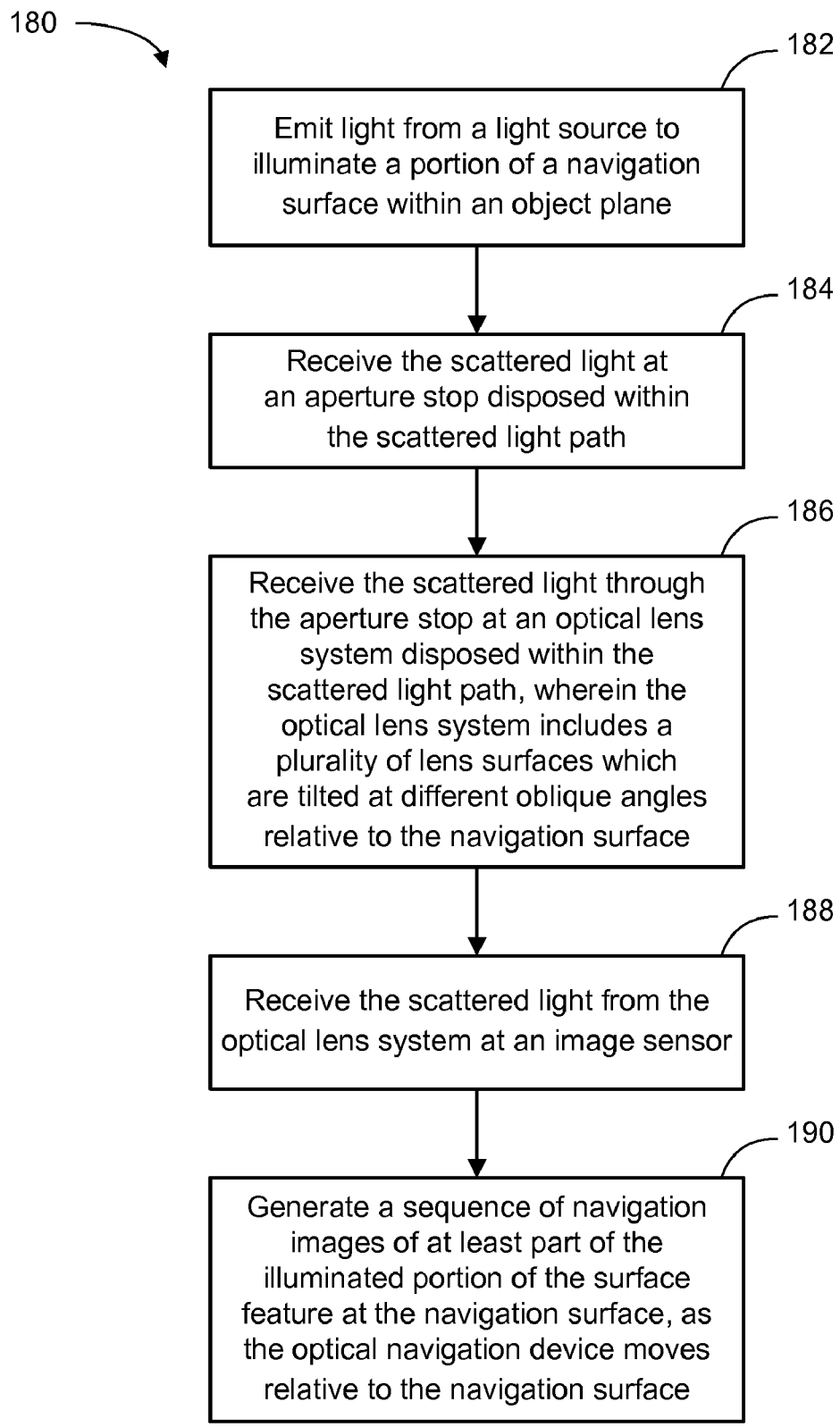
FIG. 7 depicts a flow chart diagram of one embodiment of method for operating an optical navigation device with the eccentric field imaging lens of the previous figures.

FIG. 7 depicts a flow chart diagram of one embodiment of method 180 for operating an optical navigation device 102 with the eccentric field imaging lens 114 of the previous figures. Although the method 180 is described in conjunction with the optical navigation device 102 of FIG. 1, embodiments of the method 180 may be implemented with other types of optical navigation devices.

At block 182, light is emitted from a light source 106 to illuminate a portion of a navigation surface 104 within an object plane 152. Specular light reflects off of the navigation surface 104 along a specular reflection path 144, and scattered light reflects off of a surface feature 142 at the navigation surface 104 along a scattered light path 146, which is offset from the specular reflection path 144. At block 184, the scattered light is received at an aperture stop 118 disposed within the scattered light path 146. The aperture stop 118 has an optical axis 156 defined by a normal to the aperture stop 118. The optical axis 146 of the aperture stop 118 is substantially perpendicular to the object plane 152. At block 186, the scattered light is received through the aperture stop 118 at an optical lens system 114 disposed within the scattered light path 146. The optical lens system 114 includes a plurality of lens surfaces 160 and 162 which are tilted at different oblique angles, α and β, relative to the navigation surface 104. At block 188, the scattered light is received from the optical lens system 114 at an image sensor 126. At block 190, the image sensor 126 generates a sequence of navigation images of at least part of the illuminated portion of the surface feature 142 at the navigation surface 104, as the optical navigation device 102 moves relative to the navigation surface 104. The image sensor 126 is oriented substantially parallel with the navigation surface 104. The depicted method 180 then ends.

While many aspects of several embodiments are described above, at least some embodiments, implement a single lens solution with two separate lens surfaces. In other embodiments, the single lens two surface solution may be replaced by multiple lenses with more tilted and/or decentered lens surfaces. However, the single lens two surface solution may be more cost effective than implementing multiple separate lens surfaces.

Also, for ease of manufacturing the imaging optical element 114 and the optical navigation input device 102, embodiments of the imaging optical element may be manufactured with smaller decenter and tilt values, because large decenter and tilt values can be tolerance critical.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An optical navigation device configured to determine relative movement between the optical navigation device and a navigation surface, the optical navigation device comprising:
    a light source configured to illuminate a navigation surface;
    an image sensor configured to generate a navigation image of scattered light which has scattered off of the navigation surface and follows a scattered light path, the scattered light path being offset relative to a specular reflection path by an angle that is greater than zero degrees; and
    an eccentric field imaging lens disposed between the navigation surface and the image sensor, wherein the eccentric field imaging lens comprises multiple lens surfaces which are tilted at different oblique angles relative to the navigation surface to direct the scattered light toward the image sensor.

2. The optical navigation device of claim 1, wherein the lens surfaces of the eccentric field imaging lens are decentered relative to each other in relation to an object plane that is parallel with the navigation surface.

3. The optical navigation device of claim 2, further comprising an aperture stop disposed between the navigation surface and the eccentric field imaging lens, wherein the aperture stop is decentered from an illuminated portion of the navigation surface in relation to the object plane, and wherein the aperture stop is positioned to allow the scattered light to reach the eccentric field imaging lens and inhibit light following the specular reflection path to not reach the eccentric field imaging lens.

4. The optical navigation device of claim 3, wherein the lens surfaces of the eccentric field imaging lens are decentered relative to the aperture stop in relation to the object plane.

5. The optical navigation device of claim 1, wherein the lens surfaces of the eccentric field imaging lens are tilted up to about 40 degrees in opposite directions relative to the navigation surface.

6. The optical navigation device of claim 1, wherein the lens surfaces of the eccentric field imaging lens are tilted up to about 40 degrees in the same direction relative to the navigation surface.

7. The optical navigation device of claim 1, wherein the lens surfaces of the eccentric field imaging lens are integrated into a single molded plastic lens structure.

8. The optical navigation device of claim 1, wherein at least one lens surface of the eccentric field imaging lens comprises an aspheric lens surface.

9. An optical navigation device to determine relative movement between the optical navigation device and a navigation surface, the optical navigation device comprising:
    a light source to illuminate a portion of a navigation surface within an object plane, wherein specular light reflects off of the navigation surface along a specular reflection path, and scattered light reflects off of a surface feature at the navigation surface along a scattered light path which is offset from the specular reflection path by an angle that is greater than zero degrees;
    an aperture stop disposed within the scattered light path, wherein the aperture stop has an optical axis defined by a normal to the aperture stop, wherein the optical axis of the aperture stop is substantially perpendicular to the object plane;
    an optical lens system disposed within the scattered light path to receive the scattered light through the aperture stop, wherein the optical lens system comprises a plurality of lens surfaces which are tilted at different oblique angles relative to the navigation surface; and
    an image sensor to receive the scattered light from the optical lens system and to generate a sequence of navigation images of at least part of the illuminated portion of the surface feature at the navigation surface, as the optical navigation device moves relative to the navigation surface.

10. The optical navigation device of claim 9, wherein the lens surfaces of the optical lens system are decentered with respect to each other, such that an optical axis of a first lens surface is offset from an optical axis of a second lens surface.

11. The optical navigation device of claim 10, wherein the lens surfaces of the optical lens system are decentered with respect to the aperture stop, such that optical axes of the lens surfaces are offset from the optical axis of the aperture stop.

12. The optical navigation device of claim 11, wherein the lens surfaces of the optical lens system are decentered up to about 40 percent of a diameter of each lens surface of the optical lens system.

13. The optical navigation device of claim 9, wherein the lens surfaces are tilted relative to the aperture stop, such that each lens surface is at an oblique angle relative to the aperture stop.

14. The optical navigation device of claim 9, wherein the aperture stop is disposed within an aperture plane which is substantially parallel to the object plane.

15. The optical navigation device of claim 14, wherein the image sensor is disposed within an image plane which is substantially parallel to the object plane and the aperture plane and is substantially perpendicular to the optical axis of the aperture stop.

16. The optical navigation device of claim 9, wherein at least one lens surface of the optical lens system comprises an aspheric lens surface.

17. The optical navigation device of claim 9, wherein the plurality of lens surfaces of the optical lens system are integrated into a single molded plastic lens structure.

18. The optical navigation device of claim 9, wherein the aperture stop is offset from the illuminated portion of the navigation surface by an angle of approximately 22 degrees.

19. The optical navigation device of claim 9, wherein the lens surfaces of the optical lens system are tilted up to about 40 degrees relative to the navigation surface.

20. A method for operating an optical navigation device, the method comprising:
    emitting light from a light source to illuminate a portion of a navigation surface within an object plane, wherein specular light reflects off of the navigation surface along a specular reflection path, and scattered light reflects off of a surface feature at the navigation surface along a scattered light path which is offset from the specular reflection path by an angle greater than zero degrees;
    receiving the scattered light at an aperture stop disposed within the scattered light path, wherein the aperture stop has an optical axis defined by a normal to the aperture stop, wherein the optical axis of the aperture stop is substantially perpendicular to the object plane;
    receiving the scattered light through the aperture stop at an optical lens system disposed within the scattered light path, wherein the optical lens system comprises a plurality of lens surfaces which are tilted at different oblique angles relative to the navigation surface;
    receiving the scattered light from the optical lens system at an image sensor; and
    generating a sequence of navigation images of at least part of the illuminated portion of the surface feature at the navigation surface, as the optical navigation device moves relative to the navigation surface, wherein the image sensor is oriented substantially parallel with the navigation surface.

* * * * *